US012675975B2

(12) United States Patent　　　　　　　(10) Patent No.:　US 12,675,975 B2
Kelkar et al.　　　　　　　　　　　　　　(45) Date of Patent:　　　Jul. 7, 2026

(54) ENCODING IMAGE VALUES THROUGH ATTRIBUTE CONDITIONING

(71) Applicant: ADOBE INC., San Jose, CA (US)

(72) Inventors: Sachin Madhav Kelkar, Santa Clara, CA (US); Hareesh Ravi, San Jose, CA (US); Ritiz Tambi, San Francisco, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 143 days.

(21) Appl. No.: 18/637,654

(22) Filed: Apr. 17, 2024

(65) Prior Publication Data

US 2025/0117970 A1　　Apr. 10, 2025

Related U.S. Application Data

(60) Provisional application No. 63/588,403, filed on Oct. 6, 2023.

(51) Int. Cl.
*G06T 11/00*　　　　(2026.01)
*G06V 10/771*　　　(2022.01)

(52) U.S. Cl.
CPC ............ *G06T 11/00* (2013.01); *G06V 10/771* (2022.01)

(58) Field of Classification Search
CPC .............................. G06T 11/00; G06V 10/771
See application file for complete search history.

(56) References Cited

U.S. PATENT DOCUMENTS

| | | | | |
|---|---|---|---|---|
| 2023/0377214 | A1* | 11/2023 | Kansy | G06V 10/82 |
| 2024/0161258 | A1* | 5/2024 | Maschmeyer | G06T 7/70 |
| 2024/0249446 | A1* | 7/2024 | Atzmon | G06T 11/00 |
| 2024/0256793 | A1* | 8/2024 | Maschmeyer | G06F 40/40 |
| 2024/0282016 | A1* | 8/2024 | Liu | G06Q 50/01 |
| 2024/0311693 | A1* | 9/2024 | Smith | G06N 3/045 |
| 2024/0320867 | A1* | 9/2024 | Bean | G06T 11/00 |
| 2024/0330381 | A1* | 10/2024 | Sadr | G06F 16/9535 |
| 2024/0386249 | A1* | 11/2024 | Harvey | G06N 7/01 |
| 2024/0420407 | A1* | 12/2024 | Ntavelis | G06T 19/20 |
| 2025/0022258 | A1* | 1/2025 | Li | G06N 3/0475 |
| 2025/0037323 | A1* | 1/2025 | Srinivasan | G06T 11/00 |
| 2025/0054322 | A1* | 2/2025 | Ye | G06F 40/279 |
| 2025/0111655 | A1* | 4/2025 | Povalyaev | G06T 11/00 |

OTHER PUBLICATIONS

Ronneberger, Olaf, Philipp Fischer, and Thomas Brox. "U-net: Convolutional networks for biomedical image segmentation." International Conference on Medical image computing and computer-assisted intervention. Cham: Springer international publishing, 2015. (Year: 2015).*

* cited by examiner

*Primary Examiner* — Yu Chen
(74) *Attorney, Agent, or Firm* — F. CHAU & ASSOCIATES, LLC

(57)　　　　　　　ABSTRACT

A method, apparatus, non-transitory computer readable medium, and system for image generation include obtaining a text prompt and a conditioning attribute. The text prompt is encoded to obtain a text embedding. The conditioning attribute is encoded to obtain an attribute embedding. Then a synthesized image is generated using an image generation model based on the text embedding and the attribute embedding. The synthesized image has the conditioning attribute and depicts an element of the text prompt.

19 Claims, 14 Drawing Sheets

300

310

305

1/500
f/2
150mm

315

1/30
f/5.6
150mm

320

325

1/2
f/22
150mm

330

400

"A brown colored dog"

410

405

| 1/500 |
| f/2 |
| 150mm |

415

| 1/30 |
| f/5.6 |
| 150mm |

420

425

| 1/2 |
| f/22 |
| 150mm |

430

500

"A red colored car"

510

505

1/30
f/5.6
300mm

515

1/30
f/5.6
150mm

520

525

1/30
f/5.6
18mm

530

600

"A brown colored dog"

610

605

1/30
f/5.6
300mm

615

1/30
f/5.6
150mm

620

625

1/30
f/5.6
18mm

630

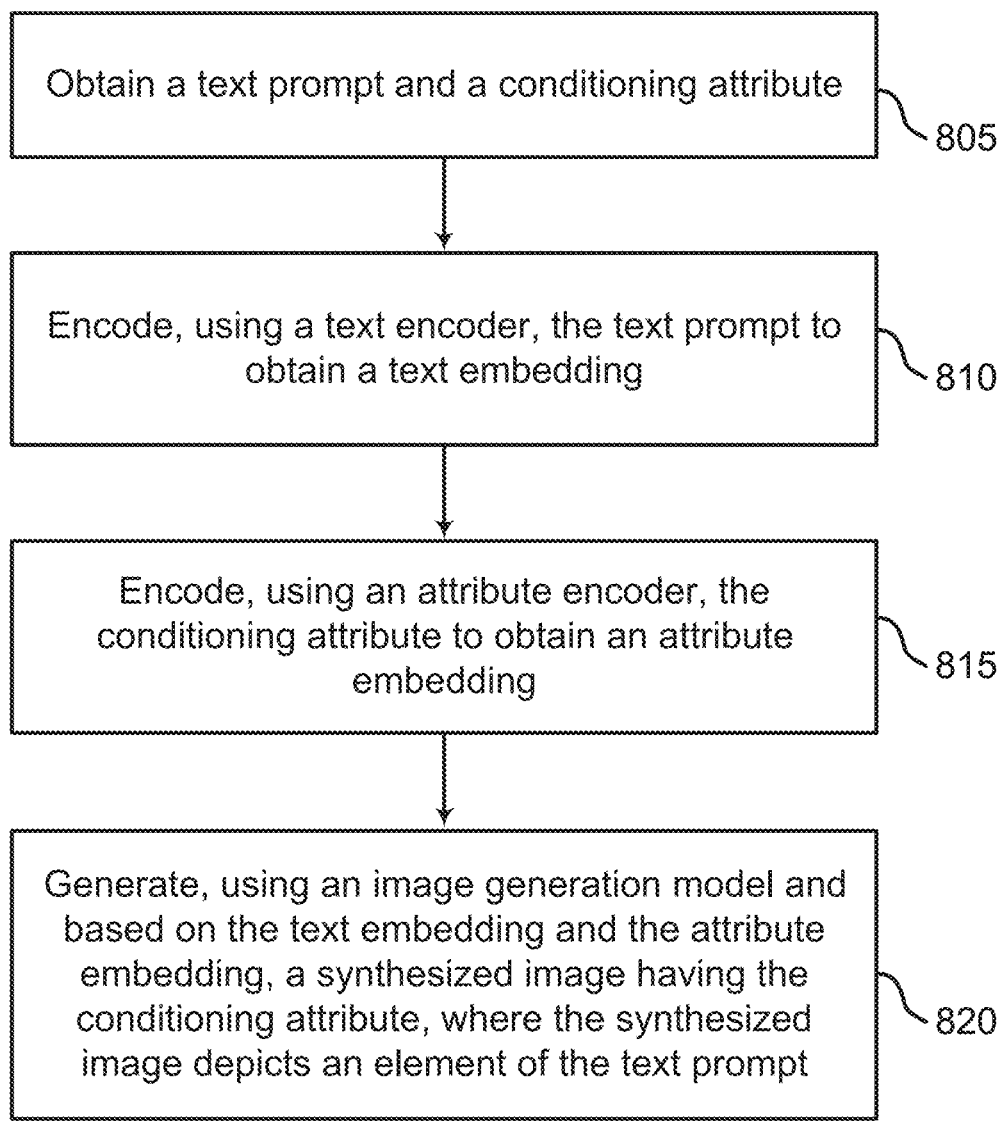

Obtain a text prompt and a conditioning attribute

805

Encode, using a text encoder, the text prompt to obtain a text embedding

810

Encode, using an attribute encoder, the conditioning attribute to obtain an attribute embedding

815

Generate, using an image generation model and based on the text embedding and the attribute embedding, a synthesized image having the conditioning attribute, where the synthesized image depicts an element of the text prompt

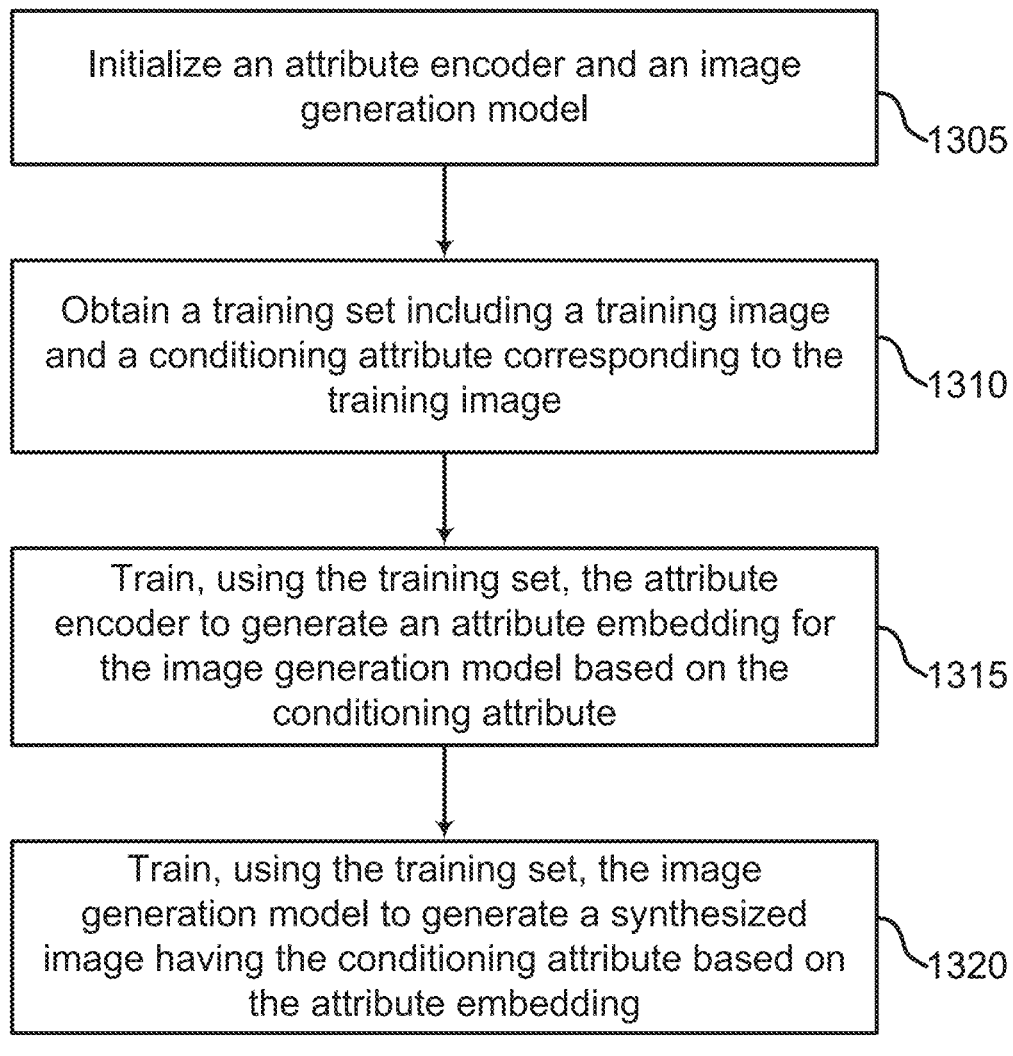

Initialize an attribute encoder and an image generation model ⌐1305

Obtain a training set including a training image and a conditioning attribute corresponding to the training image ⌐1310

Train, using the training set, the attribute encoder to generate an attribute embedding for the image generation model based on the conditioning attribute ⌐1315

Train, using the training set, the image generation model to generate a synthesized image having the conditioning attribute based on the attribute embedding ⌐1320

ENCODING IMAGE VALUES THROUGH ATTRIBUTE CONDITIONING

CROSS-REFERENCE TO RELATED APPLICATION

This application claims benefit under 35 U.S.C. § 119 to U.S. Provisional Application No. 63/588,403, filed on Oct. 6, 2023, in the United States Patent and Trademark Office, the disclosure of which is incorporated by reference herein in its entirety.

BACKGROUND

The following relates generally to image processing, and more specifically to image generation using machine learning. Image processing refers to the use of a computer to edit a digital image using an algorithm or a processing network. Recently, machine learning models have been used in advanced image processing techniques. Among these machine learning models, diffusion models and other generative models such as generative adversarial networks (GANs) have been used for various tasks including generating images with perceptual metrics, generating images in conditional settings, image inpainting, and image manipulation.

Image generation, a subfield of image processing, includes the use of machine learning models to synthesize images. Machine learning models can be used for various image generation tasks including image super-resolution, generation of images with perceptual metrics, conditional generation (e.g., generation based on text guidance), image inpainting, and image manipulation. For example, diffusion models are trained to take random noise as input and generate unseen images with features similar to the training data.

SUMMARY

The present disclosure describes systems and methods for image processing. Embodiments of the present disclosure comprise an image generation apparatus configured to generate a synthesized image based on a text prompt and a conditioning attribute. The image generation apparatus encodes, using a text encoder, the text prompt to obtain a text embedding. The image generation apparatus encodes, using an attribute encoder, the conditioning attribute to obtain an attribute embedding. The synthesized image is generated based on a combined embedding by combining the text embedding and the attribute embedding.

A method, apparatus, and non-transitory computer readable medium for image generation are described. One or more embodiments of the method, apparatus, and non-transitory computer readable medium include obtaining a text prompt and a conditioning attribute; encoding, using a text encoder, the text prompt to obtain a text embedding; encoding, using an attribute encoder, the conditioning attribute to obtain an attribute embedding; and generating, using an image generation model and based on the text embedding and the attribute embedding, a synthesized image having the conditioning attribute, wherein the synthesized image depicts an element of the text prompt.

A method, apparatus, and non-transitory computer readable medium for image generation are described. One or more embodiments of the method, apparatus, and non-transitory computer readable medium include initializing an attribute encoder and an image generation model; obtaining a training set including a training image and a conditioning attribute corresponding to the training image; training, using the training set, the attribute encoder to generate an attribute embedding for the image generation model based on the conditioning attribute; and training, using the training set, the image generation model to generate a synthesized image having the conditioning attribute based on the attribute embedding.

An apparatus and method for image generation are described. One or more embodiments of the apparatus and method include at least one processor; at least one memory including instructions executable by the at least one processor; a machine learning model comprising parameters in the at least one memory, wherein the machine learning model comprises: a text encoder configured to encode a text prompt to obtain a text embedding; an attribute encoder trained to encode a conditioning attribute to obtain an attribute embedding; and an image generation model trained to generate a synthesized image having the conditioning attribute based on the text embedding and the attribute embedding, wherein the synthesized image depicts an element of the text prompt.

BRIEF DESCRIPTION OF THE DRAWINGS

FIG. 8 shows an example of a method for image generation according to aspects of the present disclosure.

FIG. 13 shows an example of a method for training a machine learning model for image generation according to aspects of the present disclosure.

DETAILED DESCRIPTION

Figure 1:
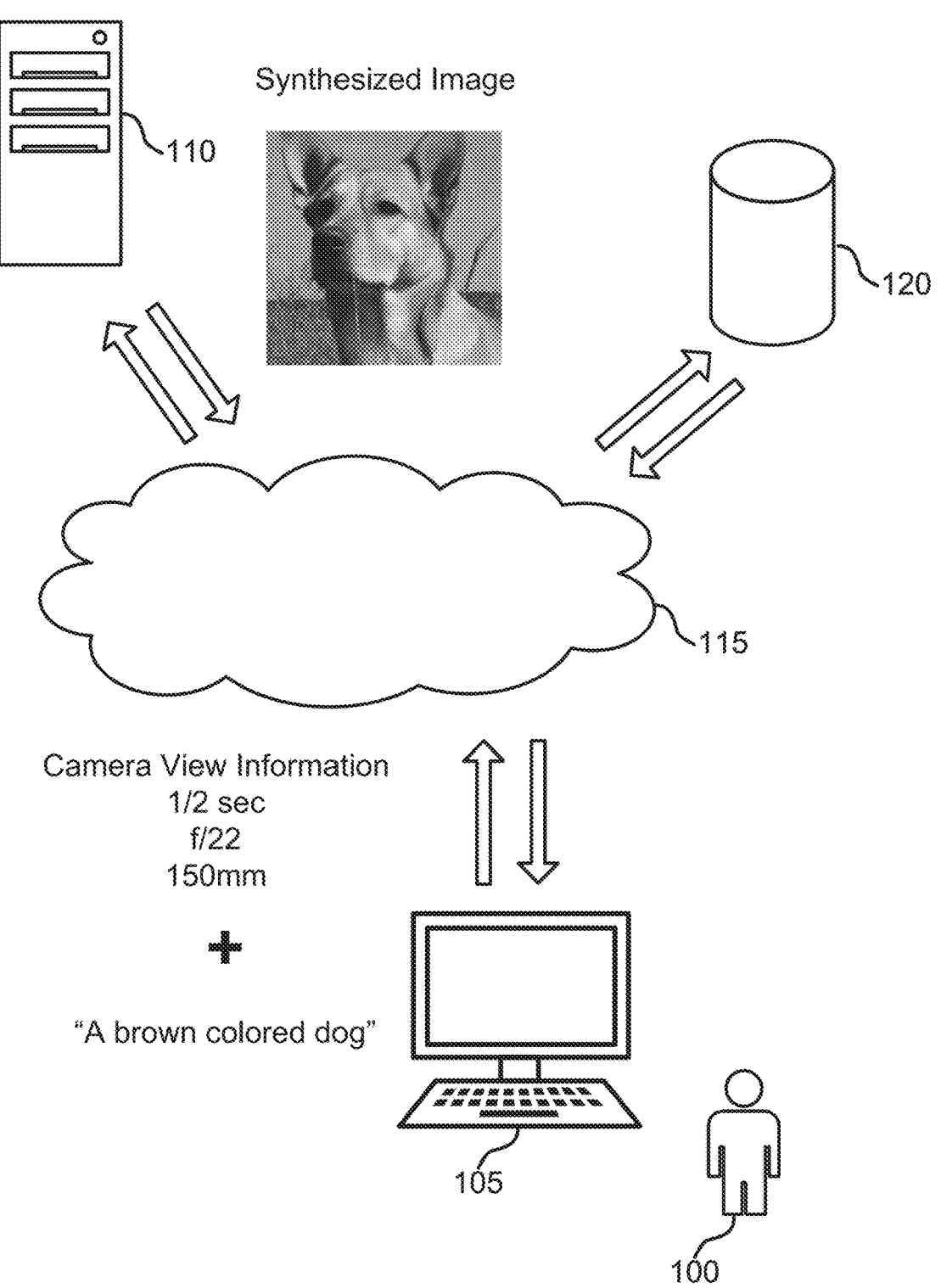
FIG. 1 shows an example of an image generation system according to aspects of the present disclosure.

The present disclosure describes systems and methods for image processing. Embodiments of the present disclosure comprise an image generation apparatus configured to generate a synthesized image based on a text prompt and a conditioning attribute. The image generation apparatus encodes, using a text encoder, the text prompt to obtain a text embedding. The image generation apparatus encodes, using an attribute encoder, the conditioning attribute to obtain an attribute embedding. The synthesized image is generated based on a combined embedding by combining the text embedding and the attribute embedding.

Diffusion models are a class of generative neural networks that can be trained to generate new data with features similar to features found in training data. Diffusion models can be used in image synthesis, image completion tasks, etc. In some examples, diffusion models take text information (e.g., a text prompt) as a condition for image generation tasks and are trained to generate images that are consistent with the elements specified in the text prompt.

Conventional models treat image attributes by simply concatenating image attributes with a text prompt and then encode the concatenated prompt using one text encoder. The text encoder is not trained to handle numerical attributes that are associated with images. As a result, image attributes such as camera view information and other types of numerical values are not well represented in the output images.

Embodiments of the present disclosure include an image generation apparatus configured to obtain a text prompt and a conditioning attribute. The image generation apparatus encodes, using a text encoder, the text prompt to obtain a text embedding. The image generation apparatus encodes, using an attribute encoder, the conditioning attribute to obtain an attribute embedding. An image generation model generates a synthesized image based on the text embedding and the attribute embedding. The synthesized image depicts an element of the text prompt with the conditioning attribute.

One or more embodiments of the present disclosure relate to conditioning text-to-image generation. The image generation apparatus includes a separately trained attribute encoder to encode image attribute(s) independently. For example, numerical attributes such as exchangeable image file format (EXIF) parameters (e.g., shutter speed, aperture value, lens focal length) are encoded separately using a specialized attribute encoder. In some cases, an attribute encoder is an EXIF encoder that can encode EXIF fields into a sequence of vectors of the same dimension and shape as a text embedding of the text prompt.

The image generation apparatus is configured to encode numerical values through attribute conditioning. In some examples, the conditioning attribute comprises a numerical attribute such as lighting position or intensity. In some examples, the conditioning attribute comprises camera view information, or one or more exchangeable image file format (EXIF) parameters. In some cases, images have more attributes than just their text description. Certain conditioning attributes are used to condition a text-to-image generation model, e.g., EXIF values as conditioning attributes.

Embodiments of the present disclosure are not limited to EXIF parameters. Methods and apparatus of the present disclosure are applicable to other types of image attributes. Additionally, methods and apparatus of the present disclosure can be applied to multiple different conditioning attributes such as camera view information, EXIF, content-type, classifier scores, etc. In an embodiment, the image generation apparatus obtains a set of conditioning attributes. The image generation apparatus encodes each of the set of conditioning attributes with a different attribute encoder to obtain a set of attribute embeddings, where the synthesized image is generated based on the set of attribute embeddings.

In some examples, the machine learning model combines various encodings and learns the encodings using an adapted network (e.g., T5 adapter). This is relatively easy than adding tokens into the vocabulary of a text encoder and fine-tuning the whole text encoder. Additionally, the encoding of each attribute is done independently, that is, the machine learning model includes specialized encoders. Conventional models perform concatenation of conditioning attributes and text using a single text encoder directly. The text encoder is not trained to encode numbers in contrast to a specialized numeric encoder. However, the attribute encoder (e.g., the EXIF encoder) based on the present disclosure is configured and trained to encode numerical attributes such as EXIF parameters. In some examples, the attribute encoder (e.g., an EXIF encoder) is trained to encode EXIF values. Incorporating the attribute encoder (trained to encode a type of image attributes) leads to increased performance in image generation tasks.

The present disclosure describes systems and methods that improve on conventional image generation models by generating more accurate images, including accurate depictions of continuous attributes in output images. For example, the output images can include camera view effect that matches a target conditioning attribute. Accordingly, users can achieve more precise control over numerical values or image-related attributes such as shutter speed, aperture, and lens focal length compared to conventional generative models. Embodiments achieve this improved accuracy and control by encoding a text prompt and encoding a conditioning attribute (e.g., EXIF values) for an image generation model using separate encoders.

Embodiments of the present disclosure ensure that synthesized images display content accurately and ensure the background and objects are consistent with a desired conditioning attribute such as camera view effect. For example, the conditioning attribute supplements the text prompt with desired camera view information. The synthesized image follows the conditioning attribute in terms of sharpness, blurriness, relation with image background, etc., and display target objects mentioned in the text prompt. Accordingly, synthesized images look more coherent and realistic. The unique implementation disentangles encoding text information and image-related numerical attributes, leading to separate control using different encoders trained to handle a specific type of conditioning attribute. The image generation model can be easily extended to include additional attribute encoders to process even more fine-grained information. Users have increased and more accurate control over text-to-image generation.

In some examples, an image generation apparatus based on the present disclosure obtains a text prompt and a conditioning attribute, and generates a synthesized image based on the text prompt and the conditioning attribute. Examples of application in the text-to-image generation context are provided with reference to FIGS. 2-7. Details regarding the architecture of an example image generation system are provided with reference to FIGS. 1 and 9-12. Details regarding the attribute-conditioned image generation process are provided with reference to FIG. 8.

Text to Image Generation

In FIGS. 1-8, a method, apparatus, and non-transitory computer readable medium for image generation are described. One or more embodiments of the method, apparatus, and non-transitory computer readable medium include obtaining a text prompt and a conditioning attribute; encoding, using a text encoder, the text prompt to obtain a text embedding; encoding, using an attribute encoder, the conditioning attribute to obtain an attribute embedding; and generating, using an image generation model, a synthesized image based on the text embedding and the attribute embedding, wherein the synthesized image depicts an element of the text prompt with the conditioning attribute.

Some examples of the method, apparatus, and non-transitory computer readable medium further include combining the text embedding and the attribute embedding to obtain a combined embedding. Some examples further include applying an adapter network to the combined embedding to obtain an adapted embedding, wherein the synthesized image is generated based on the adapted embedding. In some examples, the conditioning attribute comprises a numerical attribute. In some examples, the conditioning attribute comprises camera view information.

Some examples of the method, apparatus, and non-transitory computer readable medium further include performing a diffusion process on a noise input. In some examples, the attribute encoder is trained using an image and a ground-truth conditioning attribute corresponding to the image. In some examples, the text embedding and the attribute embedding are in a same embedding space.

Some examples of the method, apparatus, and non-transitory computer readable medium further include obtaining a plurality of conditioning attributes. Some examples further include encoding each of the plurality of conditioning attributes with a different attribute encoder to obtain a plurality of attribute embeddings, wherein the synthesized image is generated based on the plurality of attribute embeddings.

FIG. 1 shows an example of an image generation system according to aspects of the present disclosure. The example shown includes user 100, user device 105, image generation apparatus 110, cloud 115, and database 120. Image generation apparatus 110 is an example of, or includes aspects of, the corresponding element described with reference to FIG. 9.

In an example shown in FIG. 1, a text prompt and a conditioning attribute such as camera view information are provided by user 100 and transmitted to image generation apparatus 110, e.g., via user device 105 and cloud 115. The text prompt, for example, is "a brown colored dog" that indicates one or more elements in a target image. The text prompt may include layout information about the one or more elements. In some examples, the camera view information is included as a conditioning attribute. Here, "½ sec, f/22, 150 mm" are EXIF parameters, where ½ sec denotes shutter speed, f/22 denotes aperture, and 150 mm denotes lens focal length.

Image generation apparatus 110 encodes, using a text encoder, the text prompt to obtain a text embedding. Image generation apparatus 110 encodes, using an attribute encoder, the conditioning attribute to obtain an attribute embedding. Image generation apparatus 110 generates a synthesized image based on the text embedding and the attribute embedding. The synthesized image, as shown, depicts an element of the text prompt (i.e., "brown colored dog") with the conditioning attribute (e.g., ½ sec, f/22, 150 mm). In some examples, image generation apparatus 110 includes an AI generative model such as a diffusion model.

Image generation apparatus 110 returns the synthesized image to user 100 via cloud 115 and user device 105. The synthesized image incorporates the camera view information to create visually appealing effect. The process of using image generation apparatus 110 is further described with reference to FIGS. 2 and 8.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application, a text to image generation tool). In some examples, the image editing application on user device 105 may include functions of image generation apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image generation apparatus 110 includes a computer implemented network comprising a user interface, a text encoder, an attribute encoder, an adapter network, and an image generation model. Image generation apparatus 110 may also include a processor unit, a memory unit, an I/O module, and a training component. The training component is used to train a machine learning model (or an image processing network). Additionally, image generation apparatus 110 can communicate with database 120 via cloud 115. In some cases, the architecture of the image processing network is also referred to as a network, a machine learning model, or a network model. Further detail regarding the architecture of image generation apparatus 110 is provided with reference to FIGS. 9-12. Further detail regarding the operation of image generation apparatus 110 is provided with reference to FIGS. 2 and 8.

In some cases, image generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
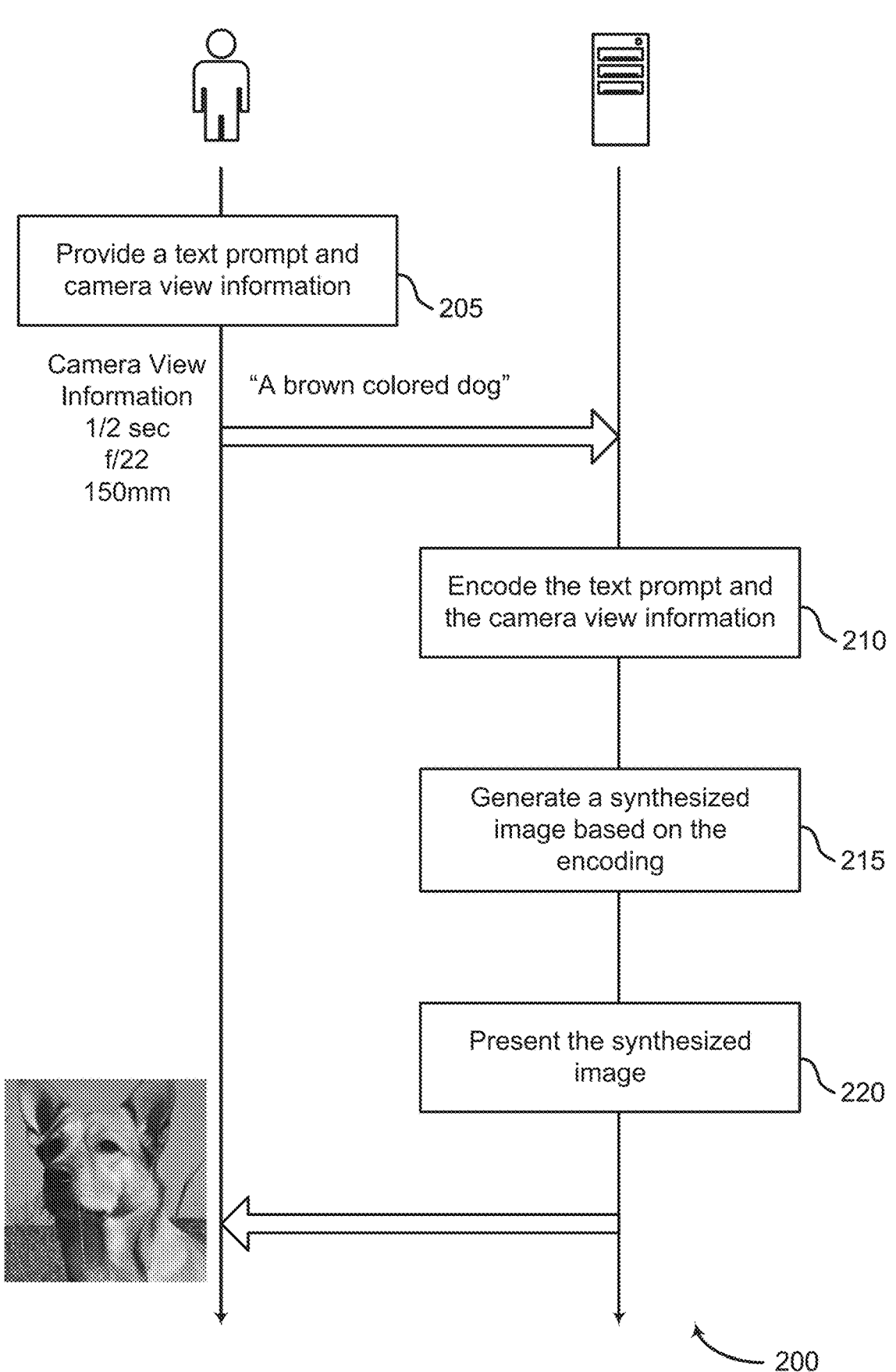
FIG. 2 shows an example of a method for image generation according to aspects of the present disclosure.

FIG. 2 shows an example of a method 200 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a text prompt and camera view information. In some cases, the operations of this step refer to, or may be performed by, a user as described with reference to FIG. 1. In some cases, images are associated with attributes other than their text description or caption. Some embodiments condition a text to image generation model with image attributes. For example, the camera view information comprising EXIF values (e.g., shutter speed, aperture value, lens focal length) can be used as conditioning attribute(s) to condition an image generation model. Embodiments of the present disclosure can be applicable to other types of image attributes.

At operation 210, the system encodes the text prompt and the camera view information. In some cases, the operations of this step refer to, or may be performed by, an image generation apparatus as described with reference to FIGS. 1 and 9. A text encoder encodes the text prompt to obtain a text embedding. An attribute encoder (different from the text encoder) encodes the conditioning attribute to obtain an attribute embedding. In the example of EXIF values, an attribute encoder (EXIF encoder) is configured to encode the EXIF values.

At operation 215, the system generates a synthesized image based on the encoding. In some cases, the operations of this step refer to, or may be performed by, an image generation apparatus as described with reference to FIGS. 1 and 9. In some examples, a diffusion model (e.g., U-Net) generates one or more synthesized images based on a combination of the text embedding and the attribute embedding. The synthesized image depicts an element of the text prompt with the conditioning attribute. In an example, the text prompt is "a brown colored dog". The conditioning attribute is 1/500, f/2, 150 mm, which are EXIF parameters. Here, 1/500 denotes shutter speed, f/2 denotes aperture value, and 150 mm denotes lens focal length. The synthesized image, via diffusion denoising process, includes a "brown colored dog" and the synthesized image includes camera view effect controlled by the EXIF parameters (e.g., background of the synthesized image is blurry).

At operation 220, the system presents the synthesized image to the user for viewing and/or subsequent editing. In some cases, the operations of this step refer to, or may be performed by, an image generation apparatus as described with reference to FIGS. 1 and 9.

Figure 3:
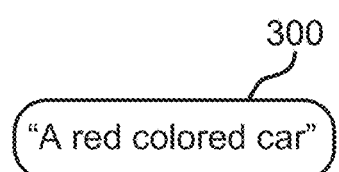
FIGS. 3 through 7 show examples of attribute conditioning effect and synthesized images according to aspects of the present disclosure.

FIG. 3 shows an example of attribute conditioning effect and synthesized images according to aspects of the present disclosure. The example shown includes text prompt 300, first camera view information 305, first synthesized image 310, second camera view information 315, second synthesized image 320, third camera view information 325, and third synthesized image 330.

FIG. 3 shows an example of attribute conditioning output. Synthesized images (e.g., 310, 320, 330) are examples of, or include aspects of, the corresponding element described with reference to FIG. 10. The image generation apparatus (described in FIGS. 1 and 9) generates synthesized images (e.g., 310, 320, 330) based on a text prompt and a conditioning attribute.

In some examples, the conditioning attribute comprises camera view information (e.g., 305, 315, 325). In some examples, the conditioning attribute comprises one or more exchangeable image file format (EXIF) parameters. As an example, in the first row, text prompt 300 is "a red colored car". First camera view information 305 (i.e., the conditioning attribute) includes "1/500, f/2, 150 mm", which are EXIF parameters. Here, 1/500 denotes shutter speed, f/2 denotes aperture, and 150 mm denotes lens focal length. The image generation apparatus generates a first set of synthesized images including first synthesized image 310 based on the text prompt and the EXIF parameters. The first set of synthesized images are shown in the first row of FIG. 3.

In the second row, corresponding text prompt is "a red colored car", the same. Second camera view information 315 (the conditioning attribute or in this case EXIF parameters) includes "1/30, f/5.6, 150 mm". The image generation apparatus generates a second set of synthesized images including second synthesized image 320 based on the text prompt and the EXIF parameters. The second set of synthesized images are shown in the second row of FIG. 3.

In the third row, corresponding text prompt is "a red colored car", the same. Corresponding EXIF parameters include "1/2, f/22, 150 mm". The image generation apparatus generates a third set of synthesized images including third synthesized image 330 based on the text prompt and the EXIF parameters. The third set of synthesized images are shown in the third row of FIG. 3.

From the first row to the third row, the backgrounds of synthesized images become more detailed (less blurry) as the aperture value (i.e., f value) increases.

Text prompt 300 is an example of, or includes aspects of, the corresponding element described with reference to FIGS. 4-7. First camera view information 305, second camera view information 315, and third camera view information 325, each of which is an example of, or includes aspects of, the corresponding element described with reference to FIGS. 4-7. First synthesized image 310, second synthesized image 320, and third synthesized image 330, each of which is an example of, or includes aspects of, the corresponding element described with reference to FIGS. 4-7.

Figure 4:
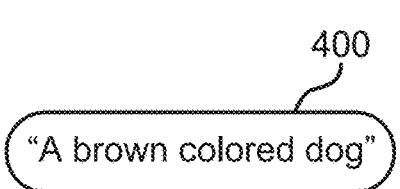

FIG. 4 shows an example of attribute conditioning effect and synthesized images according to aspects of the present disclosure. The example shown includes text prompt 400, first camera view information 405, first synthesized image 410, second camera view information 415, second synthesized image 420, third camera view information 425, and third synthesized image 430.

FIG. 4 shows an example of attribute conditioning output. Synthesized images (410, 420, 430) are examples of, or include aspects of, the corresponding element described with reference to FIG. 10. The image generation apparatus (described in FIGS. 1 and 9) generates synthesized images (e.g., 410, 420, 430) based on a text prompt and a conditioning attribute.

In some examples, the conditioning attribute comprises one or more exchangeable image file format (EXIF) parameters. As an example, in the first row, text prompt 400 is "a brown colored dog". The first camera view information 405 (a conditioning attribute) includes "1/500, f/2, 150 mm", which are EXIF parameters. Here, 1/500 denotes shutter speed, f/2 denotes aperture, and 150 mm denotes lens focal length. The image generation apparatus generates a first set of synthesized images including first synthesized image 410 based on the text prompt and the EXIF parameters. The first set of synthesized images are shown in the first row of FIG. 4.

In the second row, corresponding text prompt is "a brown colored dog", the same. Second camera view information 415 (EXIF parameters) includes "1/30, f/5.6, 150 mm". The image generation apparatus generates a second set of synthesized images including second synthesized image 420 based on the text prompt and the EXIF parameters. The second set of synthesized images are shown in the second row of FIG. 4.

In the third row, corresponding text prompt is "a brown colored dog", the same. Third camera view information 425 (EXIF parameters) includes "½, f/22, 150 mm". The image generation apparatus generates a third set of synthesized images including third synthesized image 430 based on the text prompt and the EXIF parameters. The third set of synthesized images are shown in the third row of FIG. 4.

From the first row to the third row, the backgrounds of synthesized images become more detailed (less blurry) as the aperture value (i.e., f value) increases.

Text prompt 400 is an example of, or includes aspects of, the corresponding element described with reference to FIGS. 3, and 5-7. First camera view information 405, second camera view information 415, and third camera view information 425, each of which is an example of, or includes aspects of, the corresponding element described with reference to FIGS. 3, and 5-7. First synthesized image 410, second synthesized image 420, and third synthesized image 430, each of which is an example of, or includes aspects of, the corresponding element described with reference to FIGS. 3, and 5-7.

Figure 5:
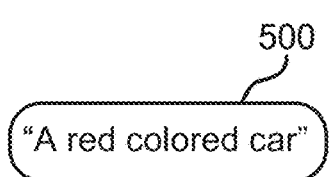

FIG. 5 shows an example of attribute conditioning effect and synthesized images according to aspects of the present disclosure. The example shown includes text prompt 500, first camera view information 505, first synthesized image 510, second camera view information 515, second synthesized image 520, third camera view information 525, and third synthesized image 530.

FIG. 5 shows an example of attribute conditioning output. Synthesized images (e.g., 510, 520, 530) are examples of, or include aspects of, the corresponding element described with reference to FIG. 10. The image generation apparatus (described in FIGS. 1 and 9) generates synthesized images (e.g., 510, 520, 530) based on a text prompt and a conditioning attribute.

In some examples, the conditioning attribute comprises one or more exchangeable image file format (EXIF) parameters. As an example, in the first row, text prompt 500 is "a red colored car". The first camera view information 505 (a conditioning attribute) includes "⅓₀, f/5.6, 300 mm", which are EXIF parameters. Here, ⅓₀ denotes shutter speed, f/5.6 denotes aperture, and 300 mm denotes lens focal length. The image generation apparatus generates a first set of synthesized images including first synthesized image 510 based on the text prompt and the EXIF parameters. The first set of synthesized images are shown in the first row of FIG. 5.

In the second row, corresponding text prompt 500 is "a red colored car", the same. Second camera view information 515 (EXIF parameters) includes "⅓₀, f/5.6, 150 mm". The image generation apparatus generates a second set of synthesized images including second synthesized image 520 based on the text prompt and the EXIF parameters. The second set of synthesized images are shown in the second row of FIG. 5.

In the third row, corresponding text prompt 500 is "a red colored car", the same. Third camera view information 525 (EXIF parameters) includes "⅓₀, f/5.6, 18 mm". The image generation apparatus generates a third set of synthesized images including third synthesized image 530 based on the text prompt and the EXIF parameters. The third set of synthesized images are shown in the third row of FIG. 5.

From the first row to the third row, the synthesized images show a camera shifting away from the object effect as the focal length value decreases.

Text prompt 500 is an example of, or includes aspects of, the corresponding element described with reference to FIGS. 3, 4, 6, and 7. First camera view information 505, second camera view information 515, and third camera view information 525, each of which is an example of, or includes aspects of, the corresponding element described with reference to FIGS. 3, 4, 6, and 7. First synthesized image 510, second synthesized image 520, and third synthesized image 530, each of which is an example of, or includes aspects of, the corresponding element described with reference to FIGS. 3, 4, 6, and 7.

Figure 6:
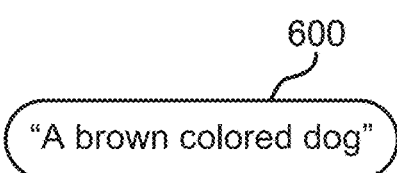

FIG. 6 shows an example of attribute conditioning effect and synthesized images according to aspects of the present disclosure. The example shown includes text prompt 600, first camera view information 605, first synthesized image 610, second camera view information 615, second synthesized image 620, third camera view information 625, and third synthesized image 630.

FIG. 6 shows an example of attribute conditioning output. Synthesized images (e.g., 610, 620, and 630) are examples of, or include aspects of, the corresponding element described with reference to FIG. 10. The image generation apparatus (described in FIGS. 1 and 9) generates synthesized images (e.g., 610, 620, 630) based on a text prompt and a conditioning attribute.

As an example, in the first row, text prompt 600 is "a brown colored dog". First camera view information 605 (a conditioning attribute) includes "⅓₀, f/5.6, 300 mm", which are EXIF parameters. Here, ⅓₀ denotes shutter speed, f/5.6 denotes aperture value, and 300 mm denotes lens focal length. The Image generation apparatus generates a first set of synthesized images including first synthesized image 610 based on the text prompt 600 and the EXIF parameters. The first set of synthesized images are shown in the first row of FIG. 6.

In the second row, corresponding text prompt is "a brown colored dog", the same. Second camera view information 615 (EXIF parameters) includes "⅓₀, f/5.6, 150 mm". The image generation apparatus generates a second set of synthesized images including second synthesized image 620 based on the text prompt and the EXIF parameters. The second set of synthesized images are shown in the second row of FIG. 6.

In the third row, corresponding text prompt is "a brown colored dog", the same. Third camera view information 625 (EXIF parameters) includes "⅓₀, f/5.6, 18 mm". The image generation apparatus generates a third set of synthesized images including third synthesized image 630 based on the text prompt and the EXIF parameters. The third set of synthesized images are shown in the third row of FIG. 6.

From the first row to the third row, the synthesized images show a camera shifting away from the object effect as the focal length value decreases.

Text prompt 600 is an example of, or includes aspects of, the corresponding element described with reference to FIGS. 3-5, and 7. First camera view information 605, second camera view information 615, and third camera view information 625, each of which is an example of, or includes aspects of, the corresponding element described with reference to FIGS. 3-5, and 7.

First synthesized image 610, second synthesized image 620, and third synthesized image 630, each of which is an example of, or includes aspects of, the corresponding element described with reference to FIGS. 3-5, and 7.

Figure 7:
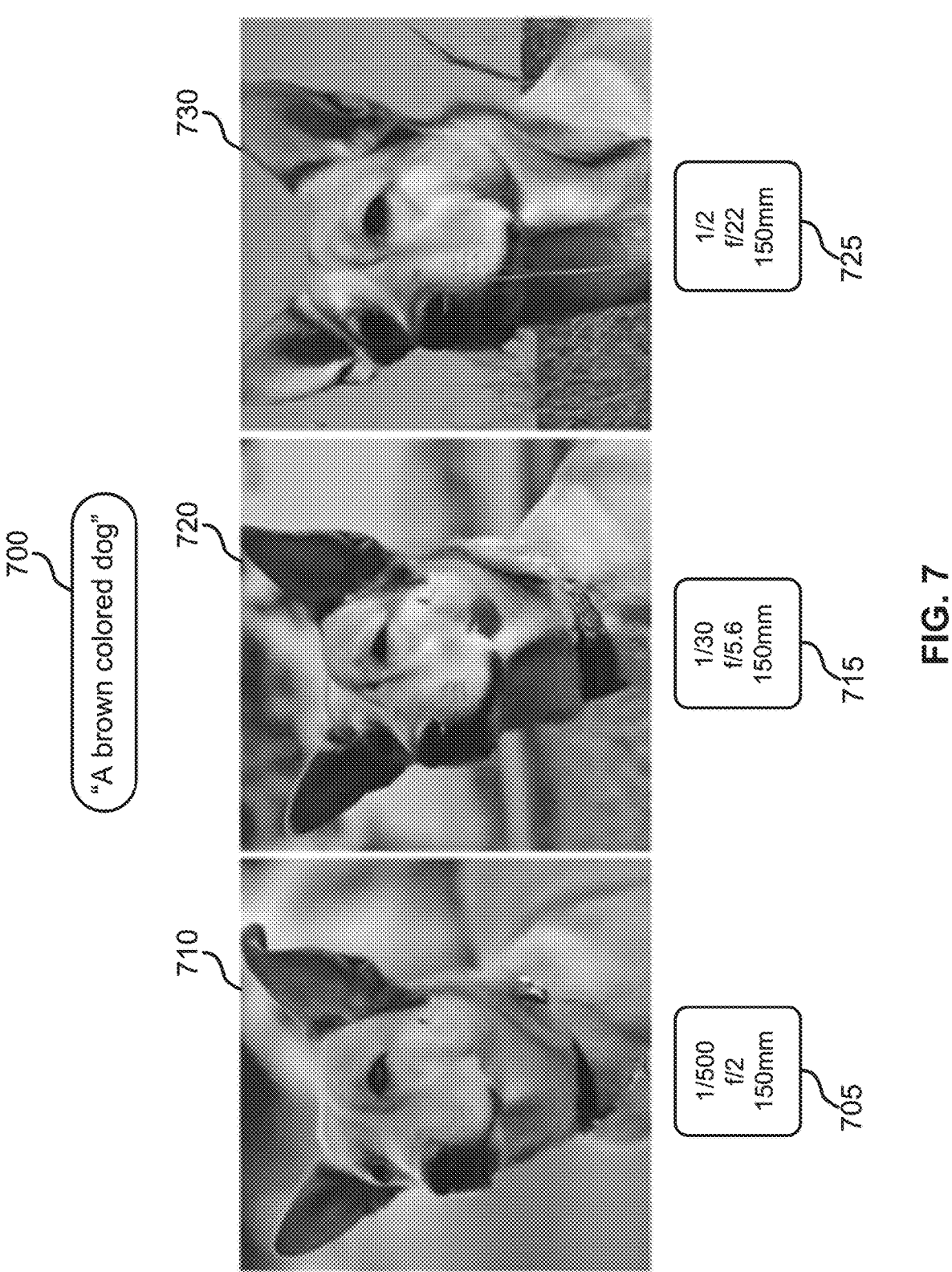

FIG. 7 shows an example of attribute conditioning effect and synthesized images according to aspects of the present disclosure. The example shown includes text prompt 700, first camera view information 705, first synthesized image 710, second camera view information 715, second synthesized image 720, third camera view information 725, and third synthesized image 730. FIG. 7 shows an example of attribute conditioning results. Synthesized images (e.g., 710, 720, 730) are examples of, or include aspects of, the corresponding element described with reference to FIG. 10.

In an example, users control background blur by changing aperture value. Synthesized images (e.g., 710, 720, 730) are generated based on a text prompt and corresponding conditioning attribute, The text prompt 700 is "a brown colored dog". In first synthesized image 710, first camera view information 705 (a conditioning attribute) includes "1/500, f/2, 150 mm", which are EXIF parameters. Here, 1/500 denotes shutter speed, f/2 denotes aperture value, and 150 mm denotes lens focal length. The image generation apparatus (with reference to FIGS. 1 and 9) generates the first synthesized image 710 based on the text prompt and the EXIF parameters. In second synthesized image 720, second camera view information 715 (the conditioning attribute) includes "1/30, f/5.6, 150 mm". In third synthesized image 730, third camera view information 725 (the conditioning attribute) includes "1/2, f/22, 150 mm".

Text prompt 700 is an example of, or includes aspects of, the corresponding element described with reference to FIGS. 3-6. First camera view information 705, second camera view information 715, and third camera view information 725, each of which is an example of, or includes aspects of, the corresponding element described with reference to FIGS. 3-6.

First synthesized image 710, second synthesized image 720, and third synthesized image 730, each of which is an example of, or includes aspects of, the corresponding element described with reference to FIGS. 3-6.

FIG. 8 shows an example of a method 800 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains a text prompt and a conditioning attribute. In some cases, the operations of this step refer to, or may be performed by, a machine learning model as described with reference to FIGS. 9 and 10. In some examples, the conditioning attribute includes camera view information such as EXIF values. EXIF values are numerical attributes and the conditioning attribute may include other types of numerical attributes that are used to condition the text-to-image generation process. In some cases, the camera view information or EXIF values are ways of describing an image. The camera view information or EXIF values indicates or describes sharpness of an element in relation to other elements in a target image.

At operation 810, the system encodes, using a text encoder, the text prompt to obtain a text embedding. In some cases, the operations of this step refer to, or may be performed by, a text encoder as described with reference to FIGS. 9 and 10. For example, the text prompt is "brown colored dog". The text encoder includes a Transformer network. The text encoder generates a set of text tokens corresponding to words in the text prompt, respectively, and generates a text embedding.

At operation 815, the system encodes, using an attribute encoder, the conditioning attribute to obtain an attribute embedding. In some cases, the operations of this step refer to, or may be performed by, an attribute encoder as described with reference to FIGS. 9 and 10.

In some examples, an attribute encoder is configured to specialize in encoding EXIF parameters. The attribute encoder is learnable. A process of training the attribute encoder to generate an attribute embedding is described in greater detail in FIG. 13. Methods and apparatus of the present disclosure can be applied to multiple different conditioning attributes such as camera view information, EXIF, content-type, classifier scores, etc. In an embodiment, the image generation apparatus obtains a set of conditioning attributes. The image generation apparatus encodes each of the set of conditioning attributes with a different attribute encoder to obtain a set of attribute embeddings, wherein the synthesized image is generated based on the set of attribute embeddings.

In an embodiment, the attribute embedding has a same shape as the text embedding (e.g., same vector length). The text embedding and the attribute embedding are combined to obtain a combined embedding. An adapter network is applied to the combined embedding to obtain an adapted embedding.

At operation 820, the system generates, using an image generation model and based on the text embedding and the attribute embedding, a synthesized image having the conditioning attribute, where the synthesized image depicts an element of the text prompt. In some cases, the operations of this step refer to, or may be performed by, an image generation model as described with reference to FIGS. 9 and 10. In some examples, the conditioning attribute includes camera view information and the synthesized image depicts substantially similar camera view effect controlled by the camera view information.

As shown in FIGS. 3-4, the backgrounds of synthesized images become more detailed (less blurry) as the aperture value (i.e., f value) increases. As shown in FIGS. 5-6, synthesized images show a camera shifting away from the object effect as the focal length value decreases. In some examples, the conditioning attribute includes a lighting attribute.

In an embodiment, the image generation model includes a diffusion model (U-Net) that is learnable. A process of training the image generation model to generate a synthesized image is described in greater detail in FIG. 13.

Network Architecture

In FIGS. 9-12, an apparatus and method for image generation are described. One or more embodiments of the apparatus and method include at least one processor; at least one memory including instructions executable by the at least one processor; a machine learning model comprising parameters in the at least one memory, wherein the machine learning model comprises: a text encoder configured to encode a text prompt to obtain a text embedding; an attribute encoder trained to encode a conditioning attribute to obtain an attribute embedding; and an image generation model trained to generate a synthesized image based on the text embedding and the attribute embedding, wherein the synthesized image depicts an element of the text prompt with the conditioning attribute.

Some examples of the apparatus and method further include an adapter network trained to generate an adapted embedding based on the text embedding and the attribute embedding, wherein the synthesized image is generated based on the adapted embedding.

In some examples, the text encoder includes a transformer architecture. In some examples, the attribute encoder includes a position encoder layer and a projection layer. In some examples, the image generation model comprises a diffusion model. In some examples, the image generation model comprises a U-Net architecture.

Some examples of the apparatus and method further include a plurality of different attribute encoders configured to generate a plurality of different attribute embeddings for the image generation model based on a plurality of different conditioning attributes, respectively.

Figure 9:
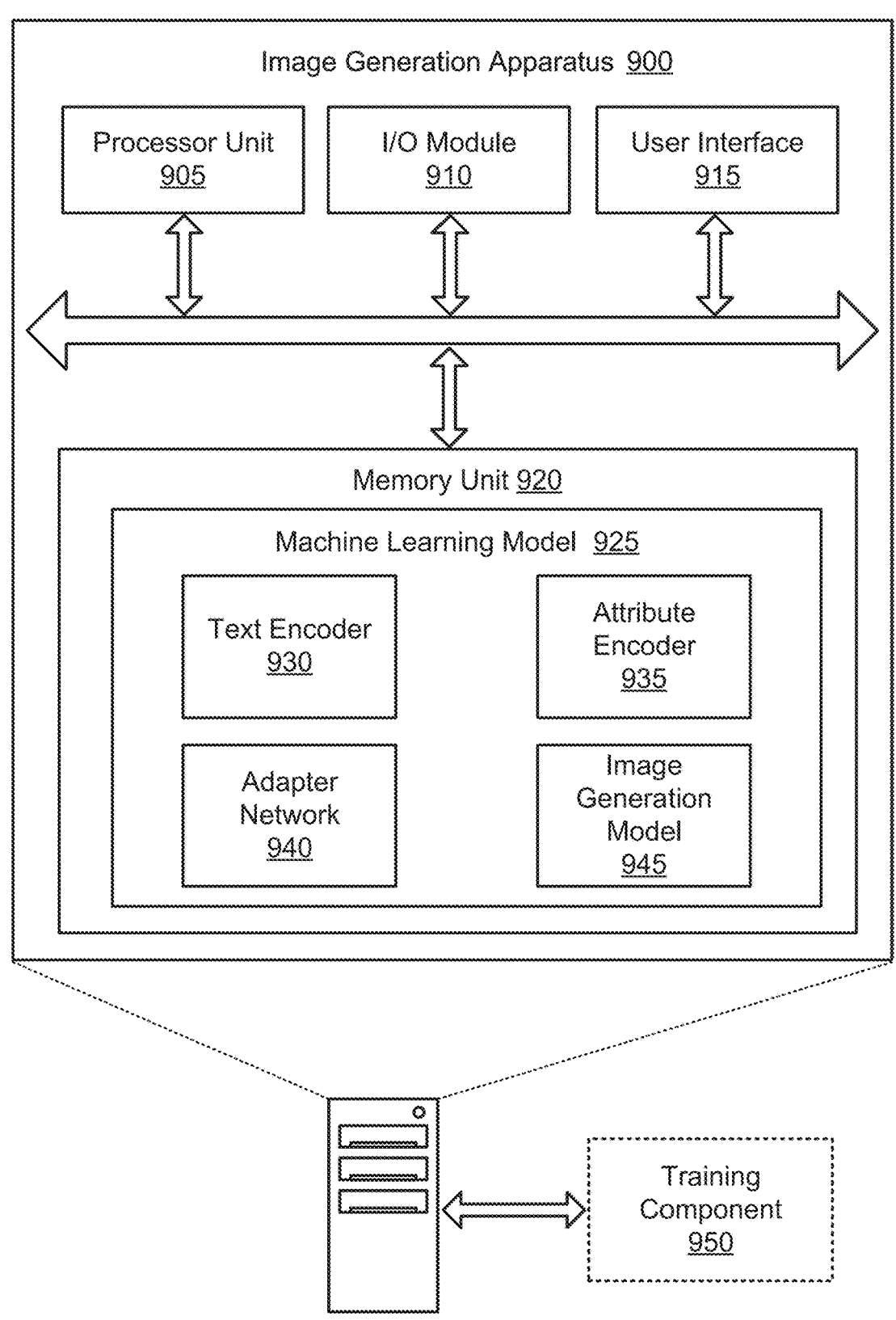
FIG. 9 shows an example of an image generation apparatus according to aspects of the present disclosure.

FIG. 9 shows an example of an image generation apparatus 900 according to aspects of the present disclosure. The example shown includes image generation apparatus 900, processor unit 905, I/O module 910, user interface 915, memory unit 920, machine learning model 925, and training component 950. Image generation apparatus 900 is an example of, or includes aspects of, the corresponding element described with reference to FIG. 1. Machine learning model 925 is an example of, or includes aspects of, the corresponding element described with reference to FIG. 10. In one embodiment, machine learning model 925 includes text encoder 930, attribute encoder 935, adapter network 940, and image generation model 945.

Processor unit 905 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 905 is configured to operate a memory array using a memory controller. In other cases, a memory controller is integrated into the processor. In some cases, processor unit 905 is configured to execute computer-readable instructions stored in a memory to perform various functions. In some embodiments, processor unit 905 includes special purpose components for modem processing, baseband processing, digital signal processing, or transmission processing.

Examples of memory unit 920 include random access memory (RAM), read-only memory (ROM), or a hard disk. Examples of memory unit 920 include solid state memory and a hard disk drive. In some examples, memory unit 920 is used to store computer-readable, computer-executable software including instructions that, when executed, cause a processor to perform various functions described herein. In some cases, memory unit 920 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 920 store information in the form of a logical state.

In some examples, at least one memory unit 920 includes instructions executable by the at least one processor unit 905. Memory unit 920 includes machine learning model 925 or stores parameters of machine learning model 925 for text to image generation and attribute conditioned image generation.

I/O module 910 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 910 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 900 includes a computer implemented artificial neural network (ANN) for text to image generation and attribute conditioned image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the machine learning model 925 are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image generation apparatus 900 includes a convolutional neural network (CNN) for text to image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, machine learning model 925 obtains a text prompt and a conditioning attribute. In some examples, machine learning model 925 combines the text embedding and the attribute embedding to obtain a combined embedding. In some examples, the conditioning attribute includes a numerical attribute. In some examples, the conditioning attribute includes camera view information. In some aspects, the text embedding and the attribute embedding are in a same embedding space.

In some examples, machine learning model 925 obtains a set of conditioning attributes. Machine learning model 925 encodes each of the set of conditioning attributes with a different attribute encoder 935 to obtain a set of attribute embeddings, where the synthesized image is generated based on the set of attribute embeddings.

According to some embodiments, machine learning model 925 comprises parameters in a memory, e.g., memory unit 920. In some examples, machine learning model 925 comprise a set of different attribute encoders 935 configured to generate a set of different attribute embeddings for the image generation model 945 based on a set of different conditioning attributes, respectively.

According to some embodiments, text encoder 930 encodes the text prompt to obtain a text embedding. The image generation model 945 is trained to generate the synthesized image based on the text embedding. In some examples, the text encoder 930 includes a transformer architecture. Text encoder 930 is an example of, or includes aspects of, the corresponding element described with reference to FIG. 10.

According to some embodiments, attribute encoder 935 encodes the conditioning attribute to obtain an attribute embedding. In some examples, the attribute encoder 935 is trained using an image and a ground-truth conditioning attribute corresponding to the image.

According to some embodiments, attribute encoder 935 is trained to encode a conditioning attribute to obtain an attribute embedding. In some examples, the attribute encoder 935 includes a position encoder layer and a projection layer. Attribute encoder 935 is an example of, or includes aspects of, the corresponding element described with reference to FIG. 10.

According to some embodiments, adapter network 940 is applied to the combined embedding to obtain an adapted embedding, where the synthesized image is generated based on the adapted embedding.

According to some embodiments, adapter network 940 is trained to generate an adapted embedding based on the text embedding and the attribute embedding. The synthesized image is generated based on the adapted embedding. Adapter network 940 is an example of, or includes aspects of, the corresponding element described with reference to FIG. 10.

According to some embodiments, image generation model 945 generates a synthesized image based on the text embedding and the attribute embedding, where the synthesized image depicts an element of the text prompt with the conditioning attribute. In some examples, image generation model 945 performs a diffusion process on a noise input.

According to some embodiments, image generation model 945 is trained to generate a synthesized image based on the text embedding and the attribute embedding, wherein the synthesized image depicts an element of the text prompt with the conditioning attribute. In some examples, the image generation model 945 includes a diffusion model. In some examples, the image generation model 945 includes a U-Net architecture. Image generation model 945 is an example of, or includes aspects of, the corresponding element described with reference to FIG. 10.

According to some embodiments, training component 950 initializes an attribute encoder 935 and an image generation model 945. In some examples, training component 950 obtains a training set including a training image and a conditioning attribute corresponding to the training image. Training component 950 trains, using the training set, the attribute encoder 935 to generate an attribute embedding for the image generation model 945 based on the conditioning attribute. Training component 950 trains, using the training set, the image generation model 945 to generate a synthesized image based on the attribute embedding.

In some examples, training component 950 identifies camera view information corresponding to the training image, where the conditioning attribute includes the camera view information. In some examples, training component 950 obtains a text prompt describing the training image.

In some examples, training component 950 trains an adapter network 940 to generate an adapted embedding based on the text embedding and the attribute embedding, where the image generation model 945 is trained to generate the synthesized image based on the adapted embedding.

In some examples, training component 950 trains, using the training set, a set of different attribute encoders 935 to generate a set of different attribute embeddings for the image generation model 945 based on a set of different conditioning attributes, respectively. In some cases, training component 950 (shown in dashed line) is implemented on an apparatus other than image generation apparatus 900.

Figure 10:
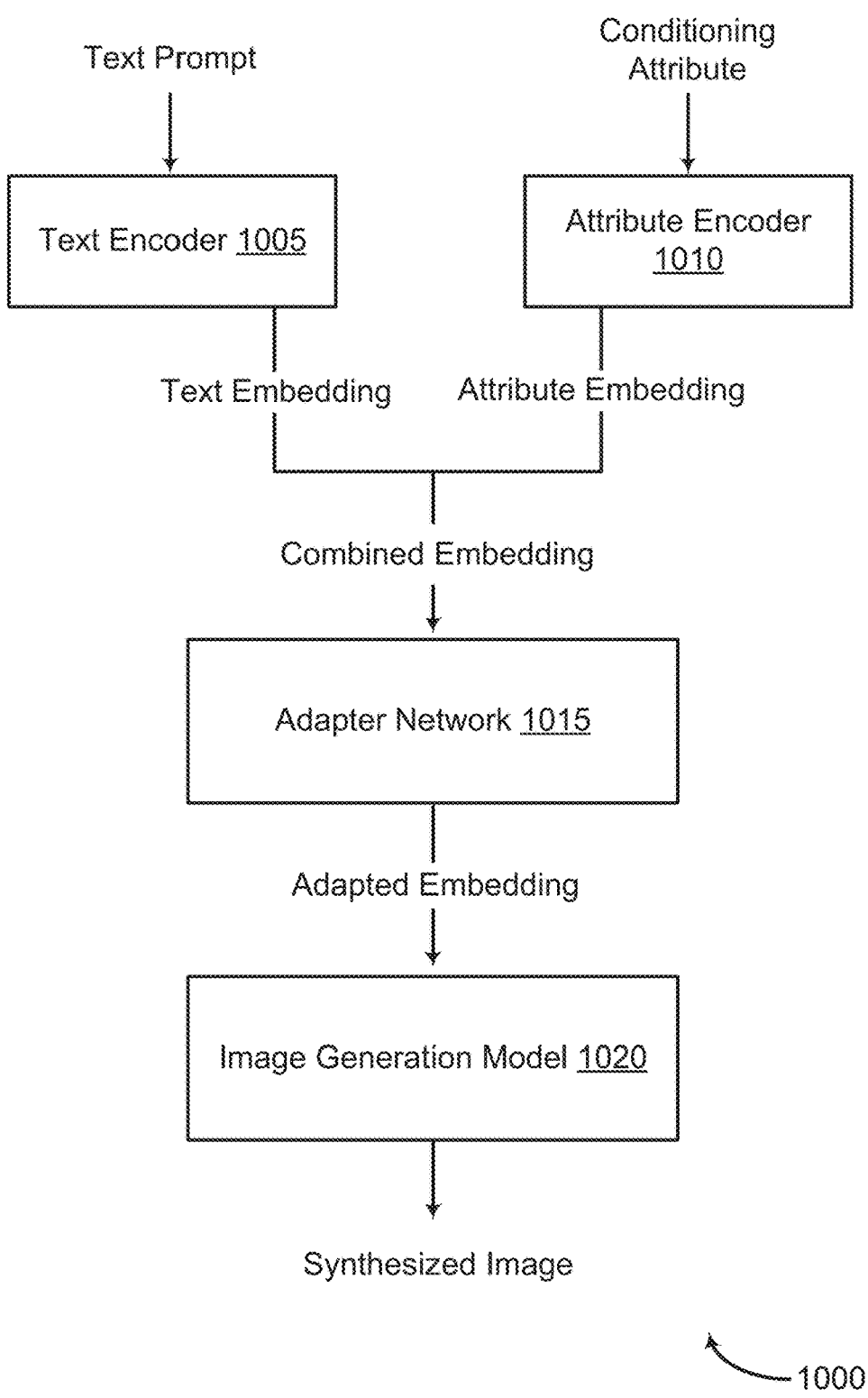
FIG. 10 shows an example of a machine learning model according to aspects of the present disclosure.

FIG. 10 shows an example of a machine learning model 1000 according to aspects of the present disclosure. The example shown includes machine learning model 1000, text encoder 1005, attribute encoder 1010, adapter network 1015, and image generation model 1020. Machine learning model 1000 is an example of, or includes aspects of, the corresponding element described with reference to FIG. 9.

In some embodiments, machine learning model 1000 encodes different attributes independently and uses an adapter network 1015 (e.g., T5 adapter) to learn the attributes. Machine learning model 1000 uses positional encodings to encode EXIF information.

As shown in FIG. 10, a text prompt is input to a text encoder 1005 (e.g., T5 encoder) to generate a text embedding (e.g., T5 text encodings). The text embedding is also denoted as t1. The T5 encoded output is then passed into adapter network 1015 (e.g., T5 adapter) to obtain an adapted encoding (i.e., t2) as output which is used as conditioning to the U-Net model. In some examples, the maximum number of text tokens is set to 128. Thus, t1 and t2 are both sequences of vectors with a sequence length of 128. Since most sentences/prompts have a length of less than 128 tokens, most values in t1, t2 are zeros.

In an embodiment, an attribute encoder 1010 is configured to encode conditioning attribute such as EXIF information into a sequence of vectors of a same dimension as t1. For example, the attribute encoder 1010 includes an EXIF encoder. Output from the attribute encoder 1010 is referred to as an attribute embedding. The attribute embedding is concatenated to t1, via a concatenation algorithm, to obtain a combined embedding. The combined embedding is also referred to as new_t1. Next, new_t1 is input to adapter network 1015 (e.g., T5 adapter) to obtain an adapted embedding (also referred to as an adapted encoding and denoted as t2).

In some examples, the EXIF encoder (i.e., a type of attribute encoder) is configured to encode fields of EXIF information such as aperture, focal length, shutter speed. The machine learning model 1000 positional encodes each to 256 dimensions and concatenates them to form a vector of length 768. Projection layers are used to transform this vector to 4096 dimensions which is the dimensions of t1.

With regard to concatenating the text embedding and the attribute embedding, input includes t1, which is a sequence of vectors of shape (128, 4096). Input also includes exif_t, which is a vector of shape (1, 4096). non_zeros_t1 refers to the subsequence of vectors in t1 which are not zeros. Let the shape be (s, 4096), where s<128. Then new_t1=concatenate (exif_t, non_zeros_t1). At this stage, new_t1 has shape of (s+1,4096). The machine learning model 1000 pads new_t1 with a sequence of zeros. That is, new_t1=pad (new_t1, 128). new_t1 now has a shape of (128, 4096).

Pad operation is executed to pad a sequence of vectors with a sequence of zeros. The attribute conditioning method is flexible and applicable to any attributes that can be encoded to a sequence of vectors. Here EXIF is an application of the conditioning method.

Text encoder 1005 is an example of, or includes aspects of, the corresponding element described with reference to FIG. 9. Attribute encoder 1010 is an example of, or includes aspects of, the corresponding element described with reference to FIG. 9. Adapter network 1015 is an example of, or includes aspects of, the corresponding element described with reference to FIG. 9. Image generation model 1020 is an example of, or includes aspects of, the corresponding element described with reference to FIG. 9.

Figure 11:
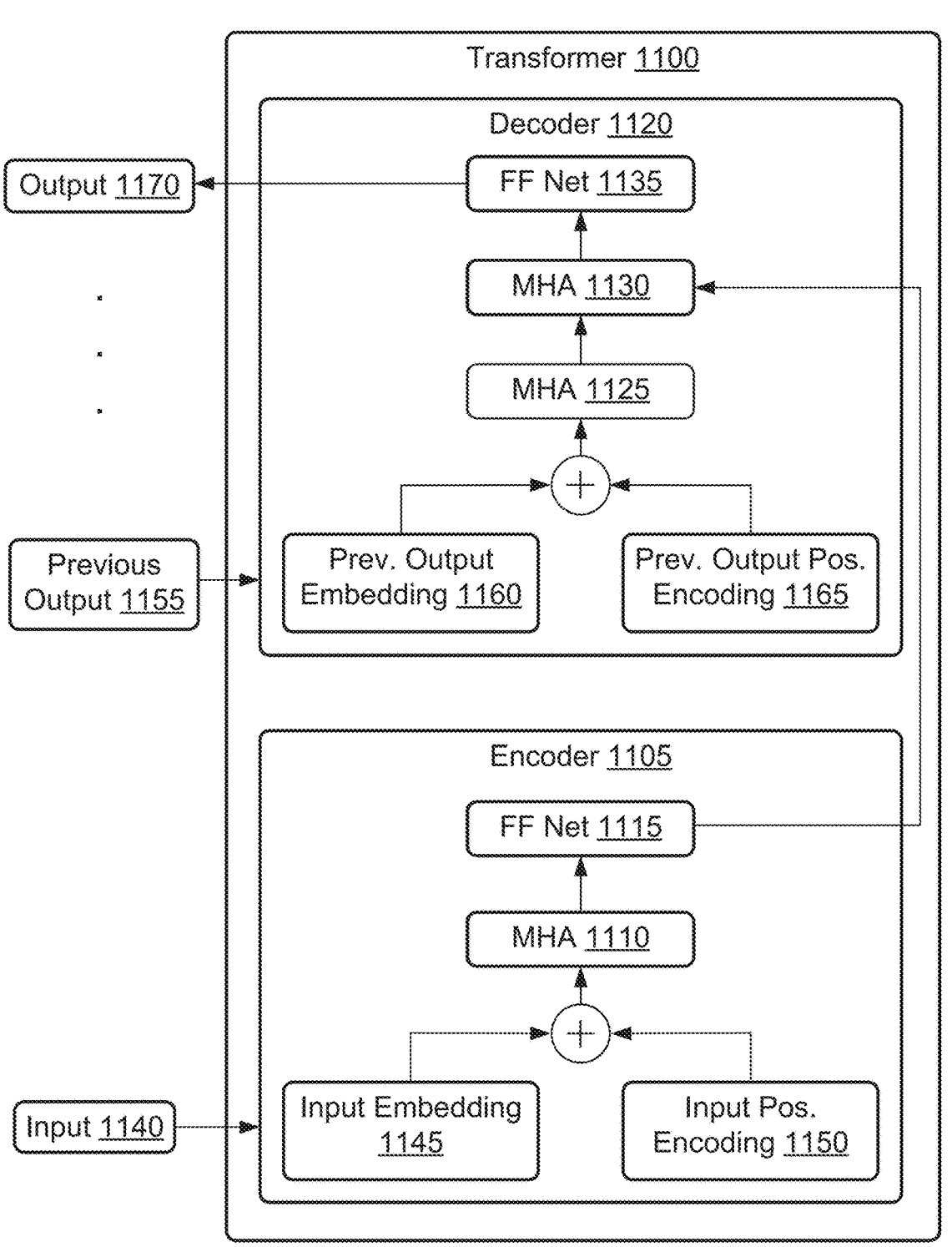
FIG. 11 shows an example of a transformer network according to aspects of the present disclosure.

FIG. 11 shows an example of a transformer network according to aspects of the present disclosure. The example shown includes transformer 1100, encoder 1105, decoder 1120, input 1140, input embedding 1145, input positional encoding 1150, previous output 1155, previous output embedding 1160, previous output positional encoding 1165, and output 1170.

In some cases, encoder 1105 includes multi-head self-attention sublayer 1110 and feed-forward network sublayer 1115. In some cases, decoder 1120 includes first multi-head self-attention sublayer 1125, second multi-head self-attention sublayer 1130, and feed-forward network sublayer 1135.

According to some aspects, a machine learning model (such as the machine learning model described with reference to FIGS. 9 and 10) comprises transformer 1100. In some cases, encoder 1105 is configured to map input 1140 (for example, a query or a prompt comprising a sequence of words or tokens) to a sequence of continuous representations that are fed into decoder 1120. In some cases, decoder 1120 generates output 1170 (e.g., a prediction of an output sequence of words or tokens) based on the output of encoder 1105 and previous output 1155 (e.g., a previously predicted output sequence), which allows for the use of autoregression.

For example, in some cases, encoder 1105 parses input 1140 into tokens and vectorizes the parsed tokens to obtain input embedding 1145, and adds input positional encoding

1150 (e.g., positional encoding vectors for input 1140 of a same dimension as input embedding 1145) to input embedding 1145. In some cases, input positional encoding 1150 includes information about relative positions of words or tokens in input 1140.

In some cases, encoder 1105 comprises one or more encoding layers (e.g., six encoding layers) that generate contextualized token representations, where each representation corresponds to a token that combines information from other input tokens via self-attention mechanism. In some cases, each encoding layer of encoder 1105 comprises a multi-head self-attention sublayer (e.g., multi-head self-attention sublayer 1110). In some cases, the multi-head self-attention sublayer implements a multi-head self-attention mechanism that receives different linearly projected versions of queries, keys, and values to produce outputs in parallel. In some cases, each encoding layer of encoder 1105 also includes a fully connected feed-forward network sublayer (e.g., feed-forward network sublayer 1115) comprising two linear transformations surrounding a Rectified Linear Unit (ReLU) activation:

$$FFN(x) = ReLU(W_1 x + b_1)W_2 + b_2 \qquad (1)$$

In some cases, each layer employs different weight parameters ($W_1$, $W_2$) and different bias parameters ($b_1$, $b_2$) to apply a same linear transformation each word or token in input 1140.

In some cases, each sublayer of encoder 1105 is followed by a normalization layer that normalizes a sum computed between a sublayer input x and an output sublayer (x) generated by the sublayer:

$$layernorm(x + sublayer(x)) \qquad (2)$$

In some cases, encoder 1105 is bidirectional because encoder 1105 attends to each word or token in input 1140 regardless of a position of the word or token in input 1140.

In some cases, decoder 1120 comprises one or more decoding layers (e.g., six decoding layers). In some cases, each decoding layer comprises three sublayers including a first multi-head self-attention sublayer (e.g., first multi-head self-attention sublayer 1125), a second multi-head self-attention sublayer (e.g., second multi-head self-attention sublayer 1130), and a feed-forward network sublayer (e.g., feed-forward network sublayer 1135). In some cases, each sublayer of decoder 1120 is followed by a normalization layer that normalizes a sum computed between a sublayer input x and an output sublayer (x) generated by the sublayer.

In some cases, decoder 1120 generates previous output embedding 1160 of previous output 1155 and adds previous output positional encoding 1165 (e.g., position information for words or tokens in previous output 1155) to previous output embedding 1160. In some cases, each first multi-head self-attention sublayer receives the combination of previous output embedding 1160 and previous output positional encoding 1165 and applies a multi-head self-attention mechanism to the combination. In some cases, for each word in an input sequence, each first multi-head self-attention sublayer of decoder 1120 attends only to words preceding the word in the sequence, and so transformer 1100's prediction for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 1105 by receiving a query Q from a previous sublayer of decoder 1120 and a key K and a value V from the output of encoder 1105, allowing decoder 1120 to attend to each word in the input 1140.

In some cases, each feed-forward network sublayer implements a fully connected feed-forward network similar to feed-forward network sublayer 1115. In some cases, the feed-forward network sublayers are followed by a linear transformation and a softmax to generate a prediction of output 1170 (e.g., a prediction of a next word or token in a sequence of words or tokens). Accordingly, in some cases, transformer 1100 generates a response as described herein based on a predicted sequence of words or tokens.

Figure 12:
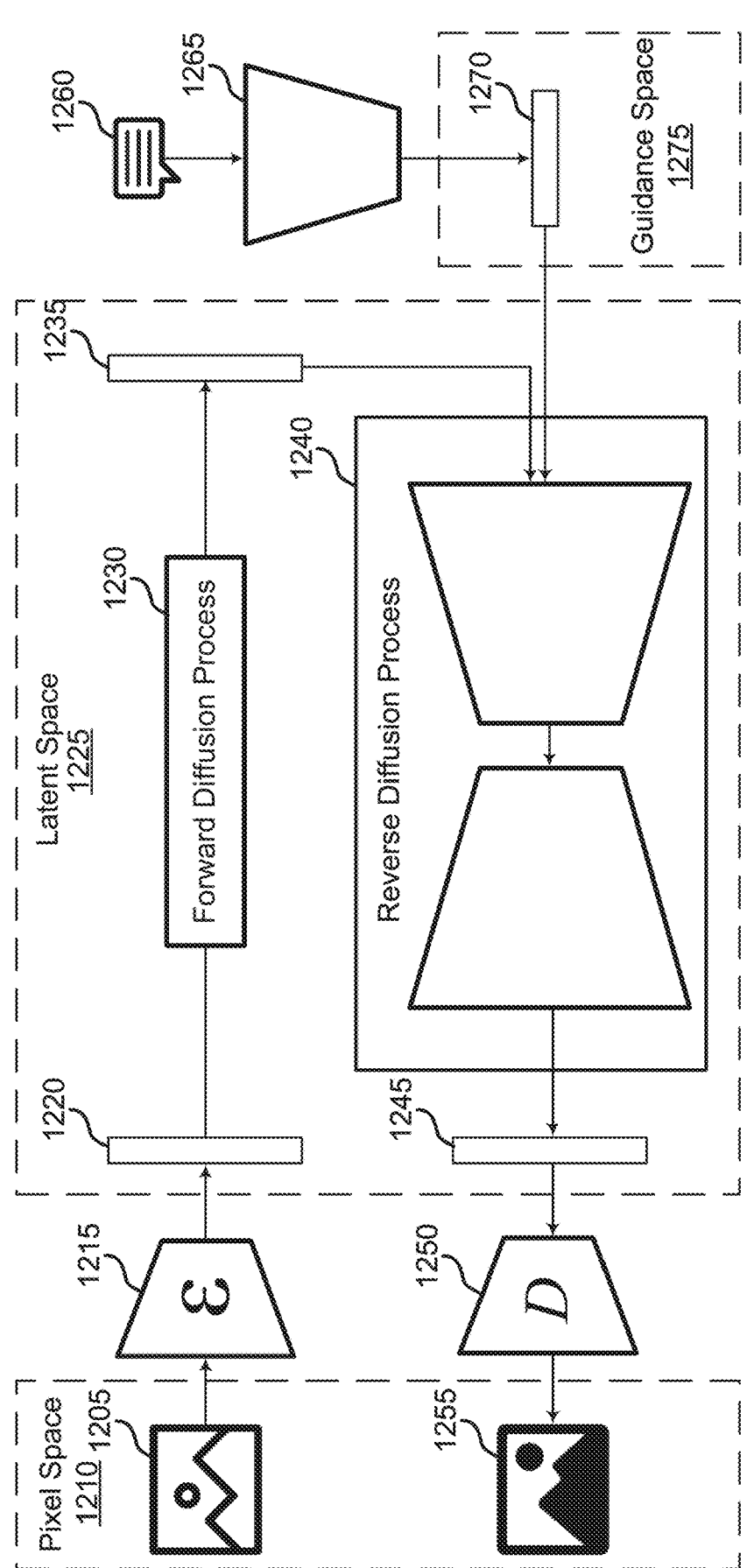
FIG. 12 shows an example of a guided latent diffusion model according to aspects of the present disclosure.

FIG. 12 shows an example of a guided latent diffusion model 1200 according to aspects of the present disclosure. The guided latent diffusion model 1200 depicted in FIG. 12 is an example of, or includes aspects of, the corresponding element described with reference to FIGS. 9-10.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1200 may take an original image 1205 in a pixel space 1210 as input and apply and image encoder 1215 to convert original image 1205 into original image features 1220 in a latent space 1225. Then, a forward diffusion process 1230 gradually adds noise to the original image features 1220 to obtain noisy features 1235 (also in latent space 1225) at various noise levels.

Next, a reverse diffusion process 1240 (e.g., a U-Net ANN) gradually removes the noise from the noisy features 1235 at the various noise levels to obtain denoised image features 1245 in latent space 1225. In some examples, the denoised image features 1245 are compared to the original image features 1220 at each of the various noise levels, and parameters of the reverse diffusion process 1240 of the diffusion model are updated based on the comparison. Finally, an image decoder 1250 decodes the denoised image features 1245 to obtain an output image 1255 in pixel space 1210. In some cases, an output image 1255 is created at each of the various noise levels. The output image 1255 can be compared to the original image 1205 to train the reverse diffusion process 1240.

In some cases, image encoder 1215 and image decoder 1250 are pre-trained prior to training the reverse diffusion process 1240. In some examples, they are trained jointly, or the image encoder 1215 and image decoder 1250 and fine-tuned jointly with the reverse diffusion process 1240.

The reverse diffusion process 1240 can also be guided based on a text prompt 1260, or another guidance prompt, such as an image, a layout, a segmentation map, etc. The text prompt 1260 can be encoded using a text encoder 1265 (e.g., a multimodal encoder) to obtain guidance features 1270 in guidance space 1275. The guidance features 1270 can be combined with the noisy features 1235 at one or more layers of the reverse diffusion process 1240 to ensure that the output image 1255 includes content described by the text prompt 1260. For example, guidance features 1270 can be combined with the noisy features 1235 using a cross-attention block within the reverse diffusion process 1240.

Training and Evaluation

In FIG. 13, a method, apparatus, and non-transitory computer readable medium for image generation are described. One or more embodiments of the method, apparatus, and non-transitory computer readable medium include initializing an attribute encoder and an image generation model; obtaining a training set including a training image and a conditioning attribute corresponding to the training image; training, using the training set, the attribute encoder to generate an attribute embedding for the image generation model based on the conditioning attribute; and training, using the training set, the image generation model to generate a synthesized image based on the attribute embedding.

Some examples of the method, apparatus, and non-transitory computer readable medium further include identifying camera view information corresponding to the training image, wherein the conditioning attribute includes the camera view information.

Some examples of the method, apparatus, and non-transitory computer readable medium further include obtaining a text prompt describing the training image. Some examples further include encoding, using a text encoder, the text prompt to obtain a text embedding, wherein the image generation model is trained to generate the synthesized image based on the text embedding.

Some examples of the method, apparatus, and non-transitory computer readable medium further include training an adapter network to generate an adapted embedding based on the text embedding and the attribute embedding, wherein the image generation model is trained to generate the synthesized image based on the adapted embedding.

Some examples of the method, apparatus, and non-transitory computer readable medium further include training, using the training set, a plurality of different attribute encoders to generate a plurality of different attribute embeddings for the image generation model based on a plurality of different conditioning attributes, respectively.

FIG. 13 shows an example of a method 1300 for training a machine learning model for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t (x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the $p(x_{t-1}|x_t)$. At each step t−1, the reverse diffusion process takes $x_t$, such as first intermediate image, and t as input. Here, t represents a step in the sequence of transitions associated with different noise levels, The reverse diffusion process outputs $x_{t-1}$, such as second intermediate image iteratively until $x_T$ is reverted back to $x_0$, the original image. The reverse process can be represented as:

$$p_\theta(x_{t-1}|x_t) := N\left(x_{t-1}; \mu_\theta(x_t, t), \sum_\theta(x_t, t)\right). \qquad (3)$$

The joint probability of a sequence of samples in the Markov chain can be written as a product of conditionals and the marginal probability:

$$x_T : p_\theta(x_{0:T}) := p(x_T) \prod_{t=1}^{T} p_\theta(x_{t-1}|x_t), \qquad (4)$$

where $p(x_T)=N(x_T; 0, 1)$ is the pure noise distribution as the reverse process takes the outcome of the forward process, a sample of pure noise, as input and $$\prod_{t=1}^{T} p_\theta(x_{t-1} \mid x_t)$$

represents a sequence of Gaussian transitions corresponding to a sequence of addition of Gaussian noise to the sample.

At inference time, observed data $x_0$, in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

A diffusion model may be trained using both a forward and a reverse diffusion process. In one example, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages. In some cases, the forward diffusion process is a fixed process where Gaussian noise is successively added to an image. In latent diffusion models, the Gaussian noise may be successively added to features in a latent space.

At each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

The training system compares predicted image (or image features) at stage n−1 to an actual image (or image features), such as the image at stage n−1 or the original input image. For example, given observed data x, the diffusion model may be trained to minimize the variational upper bound of the negative log-likelihood −log $p_\theta(x)$ of the training data. The training system then updates parameters of the model based on the comparison. For example, parameters of a U-Net may be updated using gradient descent. Time-dependent parameters of the Gaussian transitions can also be learned.

At operation 1305, the system initializes an attribute encoder and an image generation model. In some cases, the operations of this step refer to, or may be performed by, a training component as described with reference to FIG. 9. In an embodiment, the image generation model includes a text-to-image generation model (e.g., U-Net). The weights of the attribute encoder and the text-to-image generation model are initialized.

At operation 1310, the system obtains a training set including a training image and a conditioning attribute corresponding to the training image. In some cases, the operations of this step refer to, or may be performed by, a training component as described with reference to FIG. 9. In some cases, obtaining a training set includes creating training data for training the image generation model.

At operation 1315, the system trains, using the training set, the attribute encoder to generate an attribute embedding for the image generation model based on the conditioning attribute. In some cases, the operations of this step refer to, or may be performed by, a training component as described with reference to FIG. 9. At training, parameters of the attribute encoder are updated and optimized.

At operation 1320, the system trains, using the training set, the image generation model to generate a synthesized image having the conditioning attribute based on the attribute embedding. In some cases, the operations of this step refer to, or may be performed by, a training component as described with reference to FIG. 9. In an embodiment, at training, parameters of an U-Net are updated and optimized.

Figure 14:
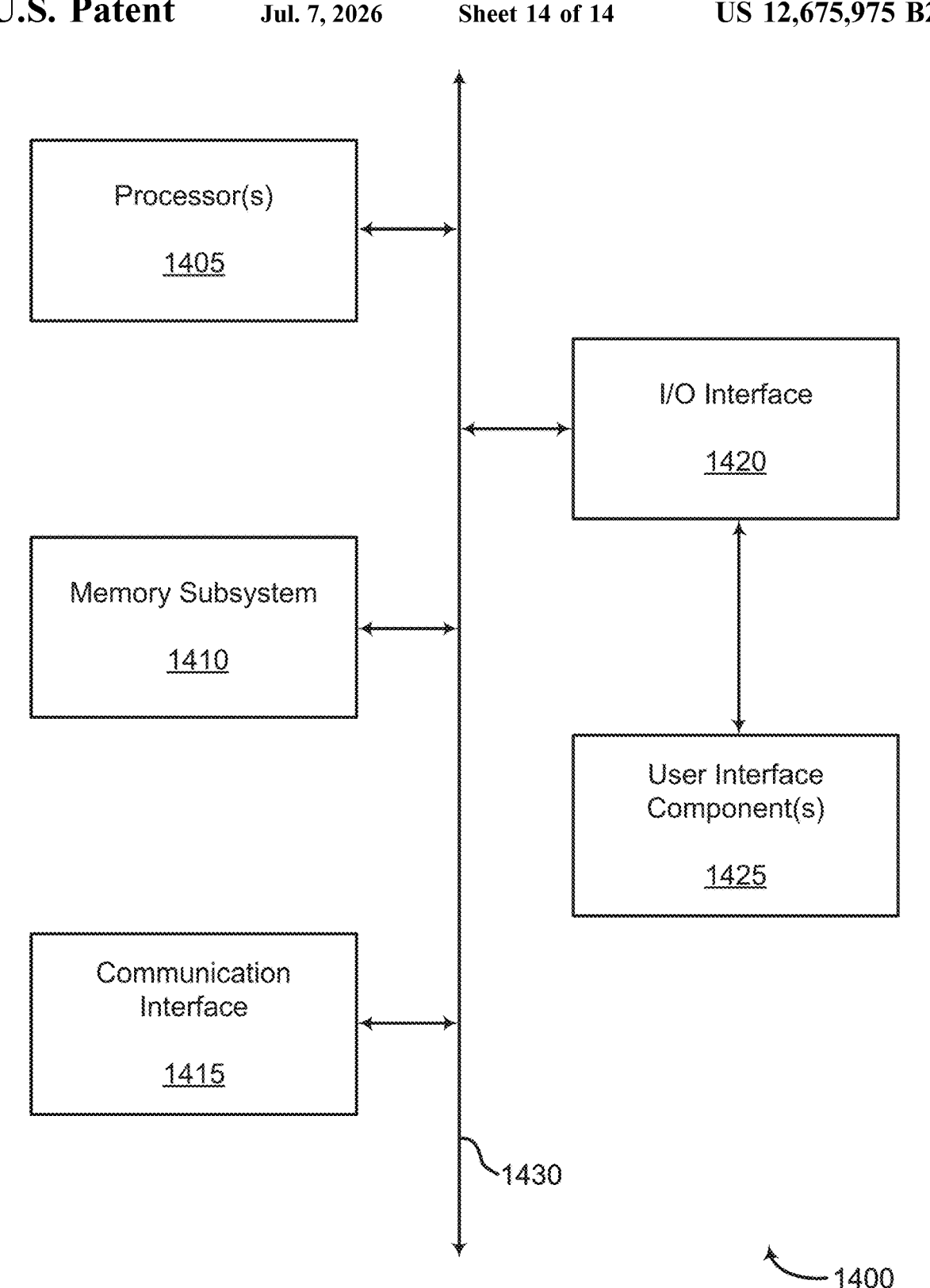
FIG. 14 shows an example of a computing device for image generation according to aspects of the present disclosure.

FIG. 14 shows an example of a computing device 1400 for generating color palettes according to aspects of the present disclosure. The example shown includes computing device 1400, processor(s) 1405, memory subsystem 1410, communication interface 1415, I/O interface 1420, user interface component(s) 1425, and channel 1430. In one embodiment, computing device 1400 includes processor(s) 1405, memory subsystem 1410, communication interface 1415, I/O interface 1420, user interface component(s) 1425, and channel 1430.

In some embodiments, computing device 1400 is an example of, or includes aspects of, image generation apparatus 110 of FIG. 1. In some embodiments, computing device 1400 includes one or more processors 1405 that can execute instructions stored in memory subsystem 1410 to obtain a text prompt and a conditioning attribute; encode, using a text encoder, the text prompt to obtain a text embedding; encode, using an attribute encoder, the conditioning attribute to obtain an attribute embedding; and generate, using an image generation model, a synthesized image based on the text embedding and the attribute embedding, wherein the synthesized image depicts an element of the text prompt with the conditioning attribute.

According to some embodiments, computing device 1400 includes one or more processors 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some embodiments, user interface component(s) 1425 enable a user to interact with computing device 1400. In some cases, user interface component(s) 1425 include an audio device, such as an external speaker system, an external display device such as a display screen, an input device (e.g., a remote control device interfaced with a user interface directly or through the I/O controller), or a combination thereof. In some cases, user interface component(s) 1925 include a GUI.

Performance of apparatus, systems and methods of the present disclosure have been evaluated, and results indicate embodiments of the present disclosure have obtained increased performance over existing technology. Example experiments demonstrate that the image generation apparatus described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ.

Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a text prompt and a numerical value of a conditioning attribute, wherein the text prompt describes an element, and wherein the numerical value indicates a target level of the conditioning attribute, and wherein the conditioning attribute comprises a continuous attribute;
encoding, using a text encoder, the text prompt to obtain a text embedding;
encoding, using an attribute encoder different from the text encoder, the numerical value of the conditioning attribute to obtain an attribute embedding in a same embedding space as the text embedding, wherein the attribute encoder is trained to encode at least three values of the conditioning attribute;
combining the text embedding and the attribute embedding to obtain a combined embedding representing the element and the target level of the conditioning attribute; and
generating, using an image generation model and based on the combined embedding, a synthesized image having the target level of the conditioning attribute, wherein the synthesized image depicts the element of the text prompt.

2. The method of claim 1, further comprising:
applying an adapter network to the combined embedding to obtain an adapted embedding, wherein the synthesized image is generated based on the adapted embedding.

3. The method of claim 1, wherein:
the conditioning attribute comprises a lighting attribute.

4. The method of claim 1, wherein:
the conditioning attribute comprises camera view information.

5. The method of claim 1, wherein generating the synthesized image comprises:
performing a diffusion process on a noise input.

6. The method of claim 1, wherein:
the attribute encoder is trained using an image and a ground-truth conditioning attribute corresponding to the image.

7. The method of claim 1, further comprising:
obtaining a plurality of conditioning attributes; and
encoding each of the plurality of conditioning attributes with a different attribute encoder to obtain a plurality of attribute embeddings, wherein the synthesized image is generated based on the plurality of attribute embeddings.

8. A method comprising:
obtaining a text prompt and a numerical value of a conditioning attribute, wherein the text prompt describes an element, and wherein the numerical value indicates a target level of the conditioning attribute, and wherein the conditioning attribute comprises a continuous attribute;
encoding, using a text encoder, the text prompt to obtain a text embedding;
encoding, using an attribute encoder different from the text encoder, the numerical value of the conditioning attribute to obtain an attribute embedding in a same embedding space as the text embedding, wherein the attribute encoder is trained to encode at least three values of the conditioning attribute;

combining the text embedding and the attribute embedding to obtain a combined embedding representing the element and the target level of the conditioning attribute;

generating, using an image generation model and based on the combined embedding, a synthesized image having the target level of the conditioning attribute, wherein the synthesized image depicts the element of the text prompt; and training, using the synthesized image, the attribute encoder to generate attribute embeddings representing the conditioning attribute for the image generation model.

9. The method of claim 8, further comprising:

obtaining a training set including a training image; and identifying camera view information corresponding to the training image, wherein the conditioning attribute includes the camera view information.

10. The method of claim 8, further comprising:

obtaining a training set including a training image, wherein the text prompt describes the training image, and wherein the image generation model is trained to generate the synthesized image based on the text embedding.

11. The method of claim 10, further comprising:

training an adapter network to generate an adapted embedding based on the text embedding and the attribute embedding, wherein the image generation model is trained to generate the synthesized image based on the adapted embedding.

12. The method of claim 8, further comprising:

obtaining a training set including a training image; and training, using the training set, a plurality of different attribute encoders to generate a plurality of different attribute embeddings for the image generation model based on a plurality of different conditioning attributes, respectively.

13. An apparatus comprising:

at least one processor;

at least one memory including instructions executable by the at least one processor; and a machine learning model comprising parameters in the at least one memory, wherein the machine learning model configured to perform operations comprising:

obtaining a text prompt and a numerical value of a conditioning attribute, wherein the text prompt describes an element, and wherein the numerical value indicates a target level of the conditioning attribute, and wherein the conditioning attribute comprises a continuous attribute;

encoding, using a text encoder, the text prompt to obtain a text embedding;

encoding, using an attribute encoder different from the text encoder, the numerical value of the conditioning attribute to obtain an attribute embedding in a same embedding space as the text embedding, wherein the attribute encoder is trained to encode at least three values of the conditioning attribute;

combining the text embedding and the attribute embedding to obtain a combined embedding representing the element and the target level of the conditioning attribute; and generating, using an image generation model and based on the combined embedding, a synthesized image having the target level of the conditioning attribute, wherein the synthesized image depicts the element of the text prompt.

14. The apparatus of claim 13, further comprising:

an adapter network trained to generate an adapted embedding based on the text embedding and the attribute embedding, wherein the synthesized image is generated based on the adapted embedding.

15. The apparatus of claim 13, wherein:

the text encoder includes a transformer architecture.

16. The apparatus of claim 13, wherein:

the attribute encoder includes a position encoder layer and a projection layer.

17. The apparatus of claim 13, wherein:

the image generation model comprises a diffusion model.

18. The apparatus of claim 13, wherein:

the image generation model comprises a U-Net architecture.

19. The apparatus of claim 13, further comprising:

a plurality of different attribute encoders configured to generate a plurality of different attribute embeddings for the image generation model based on a plurality of different conditioning attributes, respectively.

* * * * *